United States Patent [19]

Gerland et al.

[11] Patent Number: 5,453,292
[45] Date of Patent: Sep. 26, 1995

[54] PROCESS FOR APPLYING A LUMINOPHORE LAYER

[75] Inventors: Klaus Gerland, Ulm-Gögglingen; Klaus Hoffmann, Seehein-Jugenheim; Hermann Widmann, Ulm, all of Germany

[73] Assignee: Licentia Patent-Verwaltungs-GmbH, Frankfurt, Germany

[21] Appl. No.: 609,704

[22] Filed: Nov. 6, 1990

[30] Foreign Application Priority Data

Nov. 7, 1989 [DE] Germany .......................... 39 37 008.0

[51] Int. Cl.⁶ .................................................. B05D 5/06
[52] U.S. Cl. .......................... 427/71; 427/64; 427/157; 427/215; 427/180; 427/190; 427/376.1
[58] Field of Search ................. 427/64, 157, 71, 427/376.1, 219, 180, 220, 215, 190

[56] References Cited

U.S. PATENT DOCUMENTS

| | | | |
|---|---|---|---|
| 2,817,599 | 12/1957 | Edwards et al. | 427/64 |
| 3,673,450 | 6/1972 | Leach | 427/215 |
| 3,927,224 | 12/1975 | Levene | 427/64 |
| 3,966,474 | 6/1976 | Harper | 427/68 |
| 4,287,229 | 9/1981 | Watanabe et al. | 427/64 |
| 4,473,634 | 9/1984 | Dodds et al. | 427/64 |
| 4,724,161 | 2/1988 | Coutts et al. | 427/218 |

*Primary Examiner*—Janyce Bell
*Attorney, Agent, or Firm*—McGlew & Tuttle

[57] ABSTRACT

To improve the uniformity and the adhesive strength of luminophore layers, a process is proposed in which the luminophore is enveloped with glass flux and the enveloped luminophore is applied to a luminophore carrier at elevated temperatures by using acrylic resin.

10 Claims, No Drawings

PROCESS FOR APPLYING A LUMINOPHORE LAYER

FIELD OF THE INVENTION

The present invention pertains to a process for applying a luminophore layer to a luminescent screen or luminophore carrier by using luminophore powder and glass solder powder (pulverized glass) including applying heat at a temperature at which the glass solder powder will soften.

BACKGROUND OF THE INVENTION

The production of luminophore layers with glass solders as the coupling agent for producing luminescent screens with a glass front plate has been known. In such production processes, e.g., a granular luminophore is mixed with a powdered glass solder by intense grinding and screening, sprayed onto the luminescent screen carrier with a spraying device, and then sintered at elevated temperature. A certain segregation of the glass solder and luminophore cannot be avoided in this application process. As a result of which nonuniformities will appear in the luminophore layer and the surface adhesive strength.

SUMMARY AND OBJECTS OF THE INVENTION

It is an object of the present invention to improve the process described in the introduction so that it will be possible to produce luminophore layers with improved uniformity and adhesion in easy-to-control process steps.

According to the invention, a process is provided for applying a luminophore layer to a luminescent screen or luminescent carrier by using luminophore powder and glass solder powder including enveloping the luminophore particles with the glass solder powder. The enveloped luminophore particles are subsequently applied to the luminophore carrier and the envelope luminophore particles are melted on the carrier. For enveloping, the luminophore particles are first mixed with the glass solder powder and a prepolymerized acrylic resin. This is then filtered and the glass solder powder is subsequently anchored on the luminophore particles by polymerizing the acrylic resin at temperatures from 80° C. to 250° C. The luminophore carrier is coated first with an acrylic resin dissolved in an organic solvent and after evaporation of at least part of the solvent, the enveloped luminophore particles are applied to the acrylic resin layer in a finely and uniformly dispersed form. The luminophore particles are subsequently anchored on the surface of the luminophore carrier in air at elevated temperature at which the glass solder will soften. The process may be used for applying luminophore layers to metal substrates.

Extremely uniform distribution of the two components is guaranteed by the binding of the glass solder to the luminophore particles. At the same time, this leads to improved and more uniform adhesion of the luminophore particles to the substrate surface of the luminophore carrier.

DETAILED DESCRIPTION OF THE INVENTION

The present invention will be explained in greater detail on the basis of the example described below.

The granular luminophore powder is thoroughly mixed with a glass solder powder in an alcohol, preferably isopropyl alcohol, and a prepolymerized acrylic resin. This is preferably carried out by rolling on a roller frame. This mixed suspension is then filtered and subsequently dried at elevated temperatures. Suitable temperatures are, e.g., ca. 100° C. to 150° C. Further polymerization of the acrylic resin takes place during this drying, as a result of which the glass flux powder will be anchored on the surface of the luminophore particles in an abrasion-resistant manner.

During coating, i.e., the application of the luminophore, the surface of the substrate to be coated is coated with an acrylic resin dissolved in an organic solvent. After evaporation of the solvent, the luminophore powder enveloped in glass solder is applied to the remaining acrylic resin layer in a finely dispersed form, which can be performed, e.g., with a soft brush. This glass solder luminophore layer, applied in a finely dispersed form, is subsequently heated at an elevated temperature of, e.g., ca. 600° C. for a short time. The heating should be performed such that the glass solder will melt, so that the luminophore particles will be anchored on the surface of the luminophore carrier in an abrasion-resistant manner.

The process is particularly suitable for applying luminophore layers to metal substrates. However, if desired, it can also be used to produce luminescent screens for cathode ray tubes.

While a specific embodiment of the invention has been shown and described in detail to illustrate the application of the principles of the invention, it will be understood that the invention may be embodied otherwise without departing from such principles.

What is claimed is:

1. A process for applying a luminophore layer to a luminescent screen by using luminophore powder and glass solder powder, comprising the steps of:

enveloping the luminophore particles with the glass solder powder and binding the glass solder powder to the luminophore particles to anchor glass solder powder to individual luminophore particles which the glass solder powder is enveloping; subsequently applying the enveloped luminophore particles and associated anchored glass solder powder to a luminophore carrier and melting the enveloped luminophore particles and the associated glass solder powder on the carrier.

2. A process according to claim 1, wherein said step of enveloping the luminophore particles includes first mixing the glass solder powder and a prepolymerized acrylic resin, filtering the mixture; and, subsequently anchoring the glass solder powder on the luminophore particles by polymerizing the acrylic resin at elevated temperature from 80° C. to 250° C.

3. A process according to claim 1 wherein the luminophore carrier, is coated first with an acrylic resin dissolved in an organic solvent, and after evaporation of at least part of the solvent, the enveloped and bound luminophore particles are applied to the acrylic resin layer in a finely and uniformly dispersed form, and the luminophore particles are subsequently fastened on the surface of the luminophore carrier and exposed to air at elevated temperature, at which temperature the glass solder will soften.

4. A process according to claim 2 wherein the luminophore carrier is coated first with an acrylic resin dissolved in an organic solvent, and after evaporation of at least part of the solvent, the enveloped and bound luminophore particles are applied to the acrylic resin layer in a finely and uniformly dispersed form, and the luminophore particles are subsequently fastened on the surface of the luminophore carrier and exposed to air at elevated temperature, at which temperature the glass solder will soften.

5. A process according to claim 1, wherein said luminophore carrier is provided as a metal substrate.

6. A process for applying a luminophore layer to a carrier, the process comprising the steps of:

mixing glass solder, a prepolymerized acrylic resin and luminophore particles together in a manner to envelope the luminophore particles with glass solder and bind said glass solder to said luminophore particles, said luminophore particles enveloped and bound with said glass solder by said resin, forming a mixture;

distributing said luminophore particles enveloped and bound with glass solder on to the carrier; and melting said distributed luminophore particles enveloped and bound with glass solder onto the carrier in order to form the luminophore layer on the carrier.

7. A process in accordance with claim 6, further comprising:

filtering said mixture.

8. A process in accordance with claim 6, further comprising:

heating said mixture to further bind and anchor said glass solder onto said luminophore particles.

9. A process in accordance with claim 8, wherein:

said heating raises the temperature of said mixture between the temperatures of approximately 80° C. and 250° C.

10. A process for applying a luminophore layer to a carrier, the process comprising the steps of:

enveloping and binding glass solder to luminophore particles;

filtering said luminophore particles enveloped and bound with glass solder in order to remove excess glass solder not anchored and bound to said luminophore particles;

applying said luminophore particles enveloped and bound with glass solder by evenly and thoroughly distributing individual enveloped and bound luminophore particles over substantially all areas of the carrier on which the luminophore layer is desired; and melting said luminophore particles bound and anchored with glass solder onto the carrier in order to form the luminophore layer on the carrier.

* * * * *